United States Patent
Wang (10) Patent No.: US 11,463,240 B2
(45) Date of Patent: Oct. 4, 2022

(54) METHODS AND IMAGE PROCESSING DEVICES FOR ENCODING AND DECODING PRIVATE DATA

(71) Applicant: Novatek Microelectronics Corp., Hsinchu (TW)

(72) Inventor: Yu-Min Wang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/144,109

(22) Filed: Jan. 7, 2021

(65) Prior Publication Data

US 2021/0367759 A1 Nov. 25, 2021

Related U.S. Application Data

(60) Provisional application No. 63/027,962, filed on May 21, 2020.

(51) Int. Cl.
| | |
|---|---|
| *H04L 9/06* | (2006.01) |
| *H04N 19/85* | (2014.01) |
| *H04N 19/136* | (2014.01) |
| *G06T 5/00* | (2006.01) |
| *H04N 19/167* | (2014.01) |

(52) U.S. Cl.
CPC .............. *H04L 9/065* (2013.01); *G06T 5/002* (2013.01); *H04N 19/136* (2014.11); *H04N 19/167* (2014.11); *H04N 19/85* (2014.11); *G06T 2207/10016* (2013.01); *H04L 2209/04* (2013.01); *H04L 2209/34* (2013.01)

(58) Field of Classification Search
CPC .... H04N 19/85; H04N 19/136; H04N 19/167; H04L 9/065
USPC ..................................................... 375/240.26
See application file for complete search history.

(56) References Cited

U.S. PATENT DOCUMENTS

| | | | |
|---|---|---|---|
| 11,076,096 B2 | 7/2021 | Kim et al. | |
| 2013/0108105 A1* | 5/2013 | Yoo ........................ | H04N 5/275 |
| | | | 382/103 |

(Continued)

FOREIGN PATENT DOCUMENTS

| | | |
|---|---|---|
| CN | 101610408 | 12/2009 |
| TW | 201905850 | 2/2019 |

OTHER PUBLICATIONS

Office Action of Taiwan Counterpart Application, dated Dec. 17, 2021, pp. 1-8.

*Primary Examiner* — On S Mung
(74) *Attorney, Agent, or Firm* — JCIPRNET (57) ABSTRACT

Methods and image processing devices for encoding and decoding private data are proposed. The method for encoding private data includes to receive an original video frame, mask at least one private area in the original video frame to generate a protected video frame, generate a first encoded frame by encoding the protected video frame, and generate at least one output bitstream for streaming or storage according to the first encoded frame. The method for decoding private data includes to receive at least one input video bitstream to obtain a first encoded bitstream and a second encoded bitstream, decode the first encoded bitstream to generate a protected video frame including image data associated with at least one private area, and output the protected video frame to a display queue such that the at least one private area is displayed.

26 Claims, 9 Drawing Sheets

(56) References Cited

U.S. PATENT DOCUMENTS

2013/0162765 A1 6/2013 Cohen
2020/0120276 A1 4/2020 Kim et al.

* cited by examiner

METHODS AND IMAGE PROCESSING DEVICES FOR ENCODING AND DECODING PRIVATE DATA

CROSS-REFERENCE TO RELATED APPLICATION

This application claims the priority benefit of U.S. provisional applications Ser. No. 63/027,962, filed on May 21, 2020. The entirety of the above-mentioned patent application is hereby incorporated by reference herein and made a part of this specification.

TECHNICAL FIELD

The disclosure relates to techniques for encoding and decoding private data.

BACKGROUND

Figure 1:
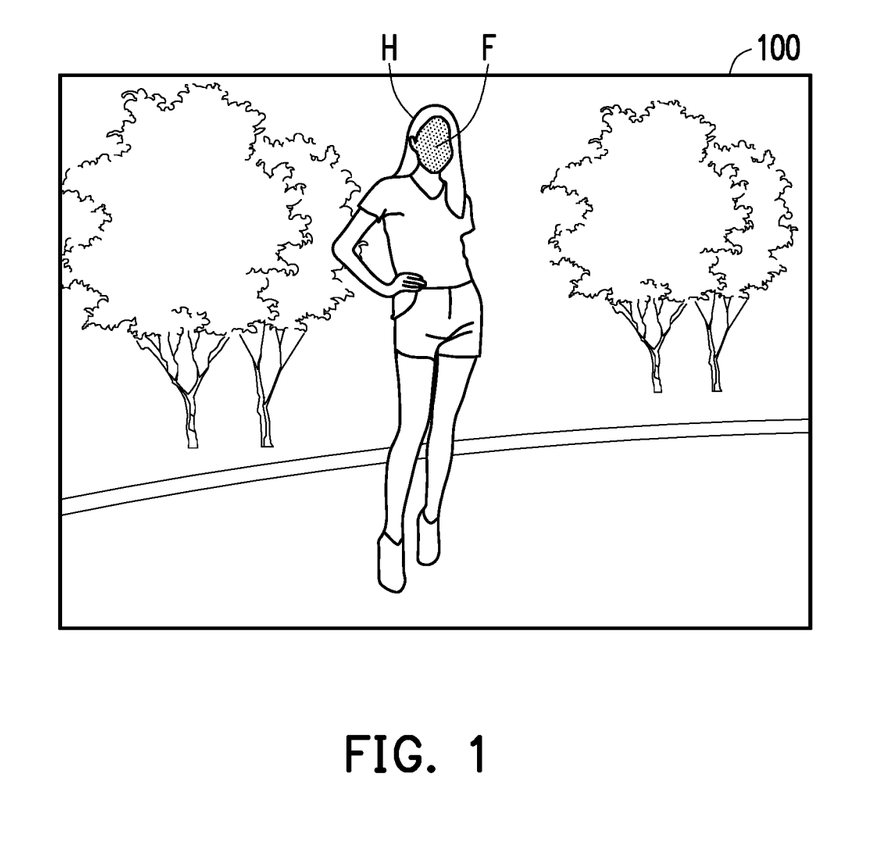
FIG. 1 illustrates a schematic diagram of a street view image with face blur in accordance with an existing technology.

Google has been using a technology to blur faces in its Street View feature in an attempt to protect the privacy of individuals as illustrated in a schematic diagram of a street view image 100 in FIG. 1, where a face F of an in individual H is anonymized. In terms of face blur in surveillance network video recorders (NVR), two conventional approaches are presented as follows.

Figure 2A:
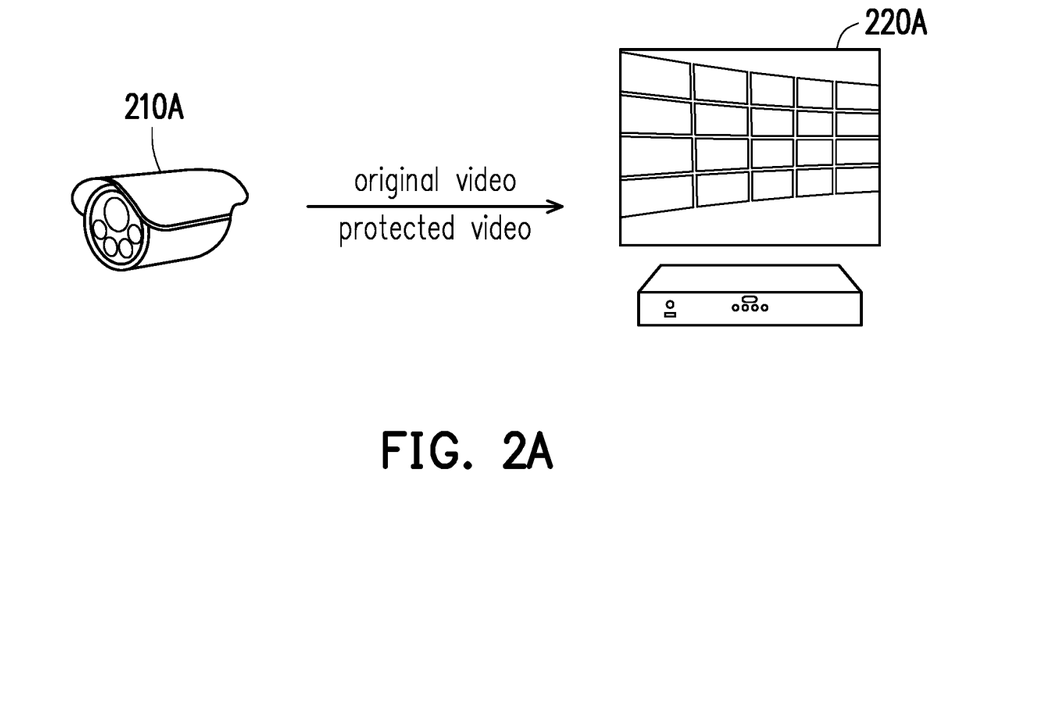
FIG. 2A illustrates a schematic diagram of a first conventional approach for face blur in NVR.

In the conventional first approach, as illustrated in FIG. 2A, an original video captured by a surveillance camera 210A would be duplicated, and all facial areas in the duplicated video would be detected and blurred to generate a protected video. Image data of both the original video and the protected video would be transmitted, for example, to a central control room 220A. A security guard would perform security monitor duties on the protected video. The original video would be encrypted, and a police officer or any other authorized person would perform investigation on the original video by using a decryption key if any criminal behaviour is found in the protected video. In the first conventional approach, double memory spaces are required for storage and double network bandwidth are required for streaming.

Figure 2B:
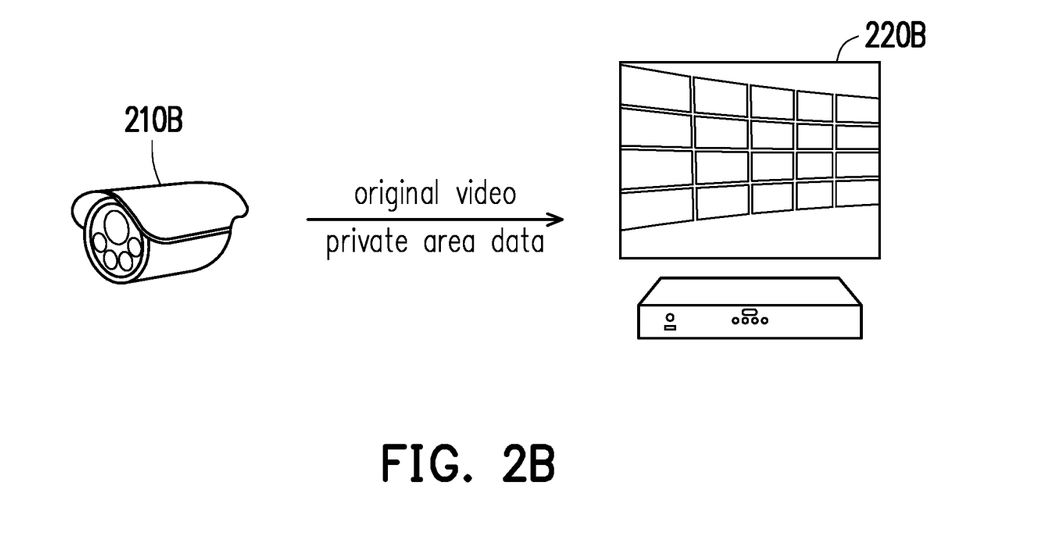
FIG. 2B illustrates a schematic diagram of a second conventional approach for face blur in NVR.

In the second conventional approach, as illustrated in FIG. 2B, an original video captured by a surveillance camera 220A and private area data such as coordinates of facial areas determined from the original video would be transmitted to a central control room 220B. The facial areas in the original video would be blurred by a computer system to generate a masked video according to the private area data in the central control room. An operator would perform security monitor duties on the masked video. The original video would be encrypted as well, and a police officer or any other authorized person would perform investigation on the original video by using a decryption key if any criminal behaviour is found in the masked video.

However, security issues have not been addressed adequately in both aforesaid approaches since the private data is secured by the NVR at the system level. The operator may access the original unprotected video if the decryption key has been leaked or video file has been transferred to other system.

SUMMARY OF THE DISCLOSURE

Methods and image processing devices for encoding and decoding private data are proposed.

According to one of the exemplary embodiments, the method for encoding private data includes the following steps. An original video frame is received. At least one private area in the original frame is masked to generate a protected video frame. A first encoded frame is generated by encoding the protected video frame. At least one output bitstream for streaming or storage is generated according to the first encoded frame.

According to one of the exemplary embodiments, the image processing device includes a receiving circuit, a masking circuit, an encoding circuit, and an output circuit. The receiving circuit is configured to receive an original video frame. The masking circuit is configured to mask at least one private area in the original video frame to generate a protected video frame. The encoding circuit is configured to generate a first encoded frame by encoding the protected video frame. The output circuit is configured to generate at least one output bitstream for streaming or storage according to the first encoded frame.

According to one of the exemplary embodiments, the image processing device includes a processor. The processor is configured to receive an original video frame, mask at least one private area in the original video frame to generate a protected video frame, generate a first encoded frame by encoding the protected video frame, and generate at least one output bitstream for streaming or storage according to the first encoded frame.

According to one of the exemplary embodiments, the method for decoding private data includes the following steps. At least one input video bitstream is received to obtain a first encoded bitstream and a second encoded bitstream. The first encoded bitstream is decoded to generate a protected video frame including image data associated with at least one private area. The protected video frame is outputted to a display queue such that the at least one private area is displayed.

According to one of the exemplary embodiments, the image processing device includes a receiving circuit, a decoding circuit, and an output circuit. The receiving circuit is configured to receive at least one input video bitstream to obtain a first encoded bitstream and a second encoded bitstream. The decoding circuit is configured to decode the first encoded bitstream to generate a protected video frame including image data of at least one private area. The output circuit is configured to output the protected video frame to a display queue such that the at least one private area is displayed.

According to one of the exemplary embodiments, the image processing device includes a processor. The processor is configured to receive at least one input video bitstream to obtain a first encoded bitstream and a second encoded bitstream, decode the first encoded bitstream to generate a protected video frame including image data of at least one private area, and output the protected video frame to a display queue such that the at least one private area is displayed.

In order to make the aforementioned features and advantages of the disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 3A:
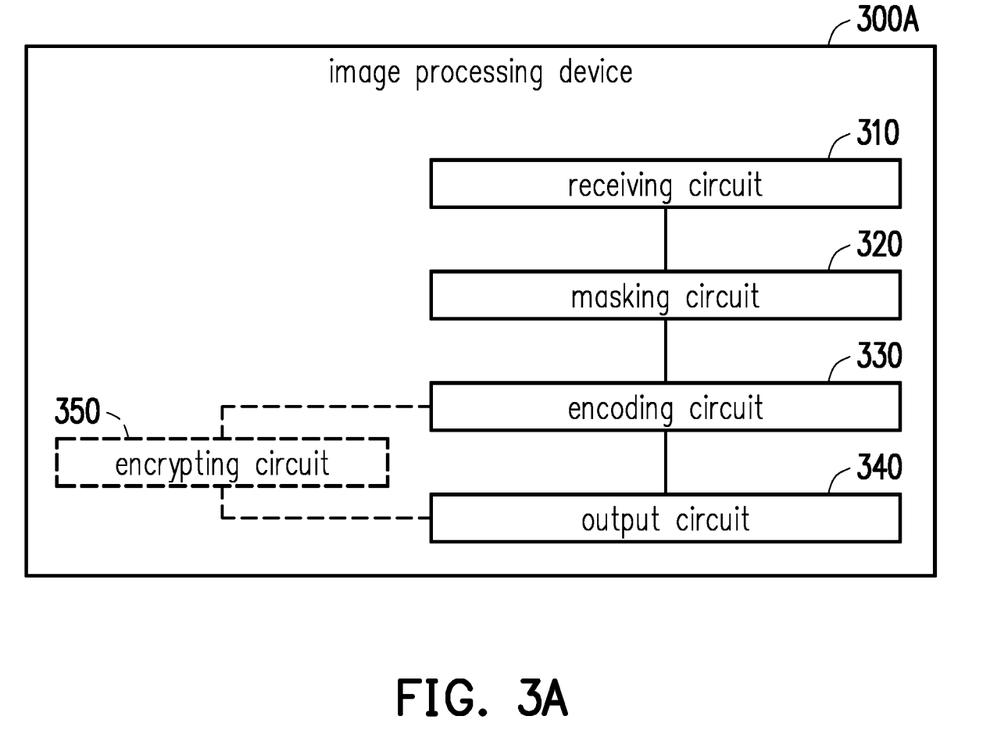
FIG. 3A and FIG. 3B illustrate schematic diagrams of proposed image processing devices in accordance with one of the exemplary embodiments of the disclosure.
Figure 3B:
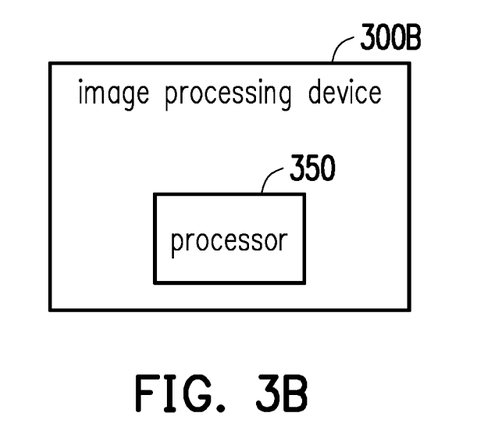

FIG. 3A and FIG. 3B illustrate schematic diagrams of proposed image processing devices in accordance with one of the exemplary embodiments of the disclosure. Note that both image processing devices proposed in FIG. 3A and FIG. 3B would be used for encoding private data. All components of the image processing devices and their configurations are first introduced in FIG. 3A and FIG. 3B. The functionalities of the components are disclosed in more detail in conjunction with FIG. 4.

Referring to FIG. 3A, an image processing device 300A would be implemented as an integrated circuit (IC) including a receiving circuit 310, a masking circuit 320, an encoding circuit 330, and an output circuit 340, where the masking circuit 320 is coupled to the receiving circuit 310, the encoding circuit 330 is coupled to the masking circuit 320, and the output circuit 340 is coupled to the encoding circuit 330. Note that in one of exemplary embodiments, an encrypting circuit 335 coupled between the encoding circuit 330 and the output circuit 340 may be optionally included in the image processing device 300A.

Referring to FIG. 3B, an image processing device 300B would be an electronic system or a computer system that includes a processor 350. The processor 350 may be may be one or more of a North Bridge, a South Bridge, a field programmable array (FPGA), a programmable logic device (PLD), an application specific integrated circuit (ASIC), other similar devices, or a combination thereof. The processor may also be a central processing unit (CPU), a programmable general purpose or special purpose microprocessor, a digital signal processor (DSP), a graphics processing unit (GPU), other similar devices, or a combination thereof.

Figure 4:
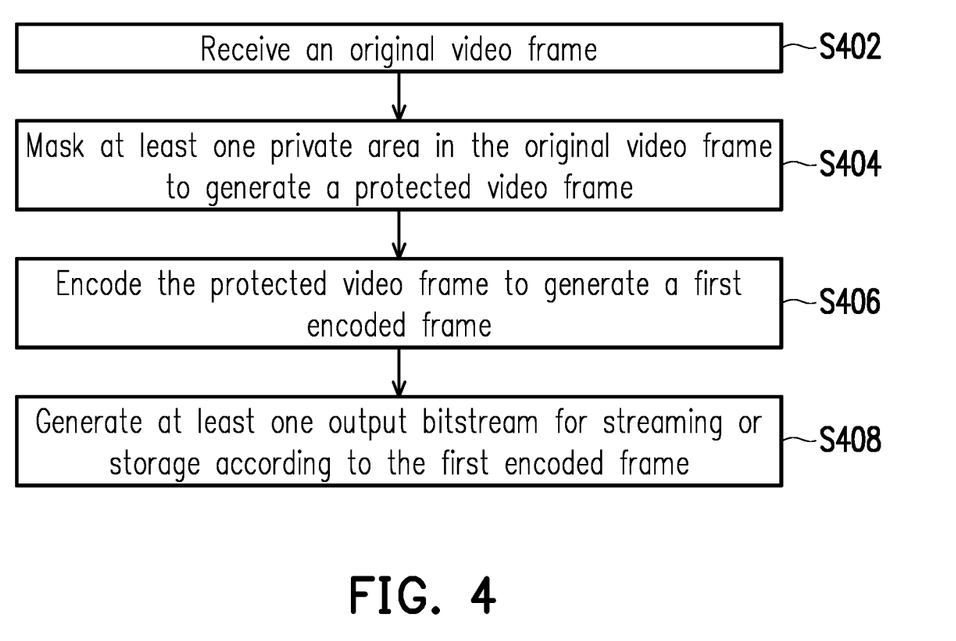
FIG. 4 illustrates a flowchart of a proposed method for encoding private data in accordance with one of the exemplary embodiments of the disclosure.

FIG. 4 illustrates a flowchart of a proposed method for encoding private data in accordance with one of the exemplary embodiments of the disclosure. The steps of FIG. 4 could be implemented by the proposed image processing device 300A and 300B as respectively illustrated in FIG. 3A and FIG. 3B.

Referring to FIG. 4 in conjunction to FIG. 3A, the receiving circuit 310 would receive an original video frame (Step S402), and the masking circuit 320 would mask at least one private area in the original video frame to generate a protected video frame (Step S404). Herein, such private area may be a facial area of a person and may be masked through any face blurring techniques as known per se. In other words, the identity of the person appearing in the protected video frame may be protected and anonymized. Next, the encoding circuit 330 would generate a first encoded frame by encoding the protected video frame (Step S406), and the output circuit 408 would generate at least one output bitstream for streaming or storage according to the first encoded frame (Step S408). More details would be provided later. Note that the steps S402-S406 could also be performed by the processor 350 of the image processing device 300B in FIG. 3B. The descriptions would be omitted for brevity's sake.

Figure 5:
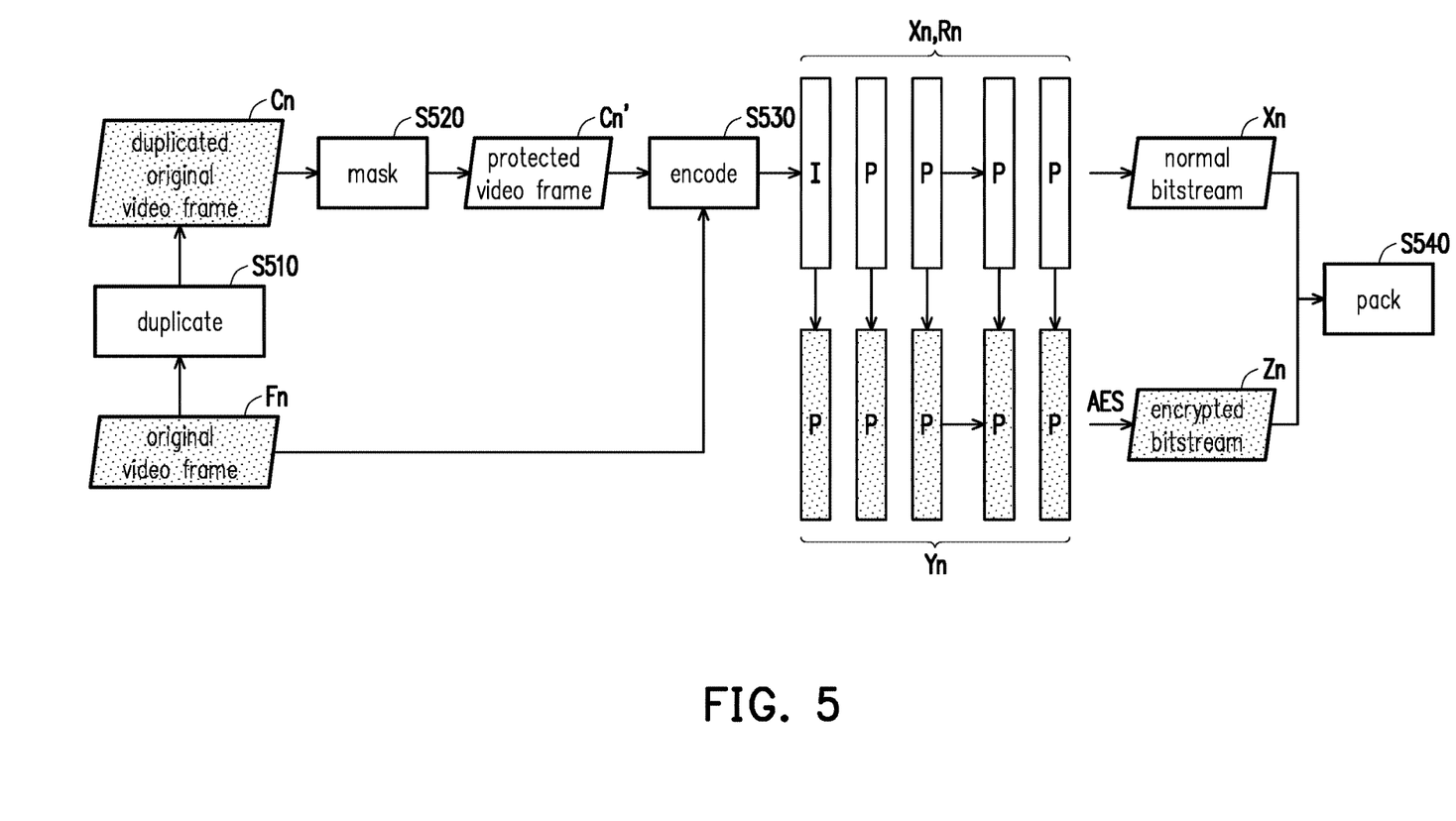
FIG. 5 illustrates a functional diagram of a proposed method for encoding private data in accordance with one of the exemplary embodiments of the disclosure.

For better comprehension, FIG. 5 illustrates a functional diagram of a proposed method for encoding private data in accordance with one of the exemplary embodiments of the disclosure. The steps of FIG. 5 could be implemented by the proposed image processing device 300A and 300B as respectively illustrated in FIG. 3A and FIG. 3B. In the following description, only one frame would be presented for illustration purposes.

Referring to FIG. 5 in conjunction to FIG. 3A, the receiving circuit 310 would receive an original video frame Fn and duplicate (S510) the original frame Fn to generate a duplicated original video frame Cn. Next, the masking circuit 320 would mask (S520) the duplicated original video frame Cn to generate a protected video frame Cn'.

The encoding circuit 330 would encode (S530) the protected video frame Cn' to generate a reference frame Rn and a first encoded frame Xn. Note that the protected video frame Cn' would be encoded with a reference frame R(n−1) if coded to p-frame. The encoding circuit 330 would also encode (S530) the original video frame Cn by using the reference frame Rn to generate a second encoded frame Yn. Next, the encrypting circuit 335 would encrypt the second encoded frame Yn to generate an encrypted second encoded frame Zn using, for example, the AES encryption algorithm.

The output circuit 340 would generate at least one output bitstream for streaming or storage according to the first encoded frame Xn (considered as a normal bitstream) and the encrypted second encoded frame Zn (considered as an encrypted bitstream). Herein, the output circuit 340 would pack (S540) the first encoded frame Xn and the encrypted second encoded frame Zn into one bitstream or separated bitstreams for storage or streaming. In one exemplary embodiment, the output circuit 340 may pack the first encoded frame Xn into a first output bitstream and pack the encrypted second encoded frame into a second output bitstream. In another exemplary embodiment, the output circuit 340 may pack the first encoded frame Xn and the encrypted second encoded frame Zn into a combined output bitstream.

Note that the flow in FIG. 5 could also be performed by the processor 350 of the image processing device 300B in FIG. 3B. The descriptions would be omitted for brevity's sake.

In terms of video encoding, note that the second encoded frame Yn keeps the difference between the original frame Fn and the reference frame Rn only. The bitstream Zn would only contain private data (private area) and would be considered as "a private layer". The private layer would be packed in the supplemental enhancement information (SEI) in the network abstraction layer (NAL) unit. In terms of video decoding and playback, the SEI would be packed with a normal bitstream and would be ignored by NVR while playback and liveview, and NVR would play the private layer only with an authorized key (i.e. a decryption key).

Figure 6A:
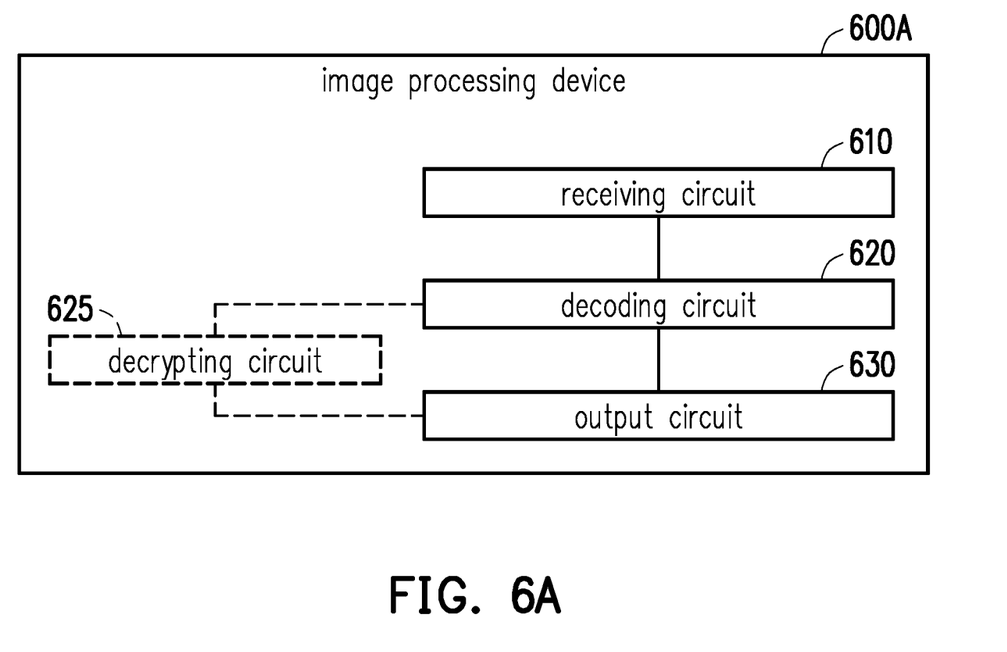
FIG. 6A and FIG. 6B illustrate schematic diagrams of proposed image processing devices in accordance with one of the exemplary embodiments of the disclosure.
Figure 6B:
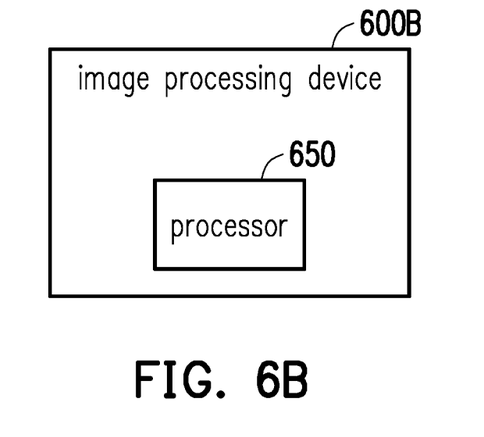

In detail, FIG. 6A and FIG. 6B illustrate schematic diagrams of proposed image processing devices in accordance with one of the exemplary embodiments of the disclosure. Note that both image processing devices proposed in FIG. 6A and FIG. 6B would be used for decoding private data. All components of the image processing devices and their configurations are first introduced in FIG. 6A and FIG. 6B. The functionalities of the components are disclosed in more detail in conjunction with FIG. 7.

Referring to FIG. 6A, an image processing device 600A would be implemented as an integrated circuit (IC) including a receiving circuit 610, a decoding circuit 620, and an output circuit 630, where the decoding circuit 620 is coupled to the receiving circuit 610, and the output circuit 630 is coupled to the decoding circuit 620. Note that in one of exemplary embodiments, a decrypting circuit 625 coupled between the decoding circuit 620 and the output circuit 630 may be optionally included in the image processing device 600A.

Referring to FIG. 6B, an image processing device 600B would be an electronic system or a computer system that includes a processor 650. The processor 650 may be may be one or more of a North Bridge, a South Bridge, a FPGA, a PLD, an ASIC, other similar devices, or a combination thereof. The processor may also be a CPU, a programmable general purpose or special purpose microprocessor, a DSP, a GPU, other similar devices, or a combination thereof.

Figure 7:
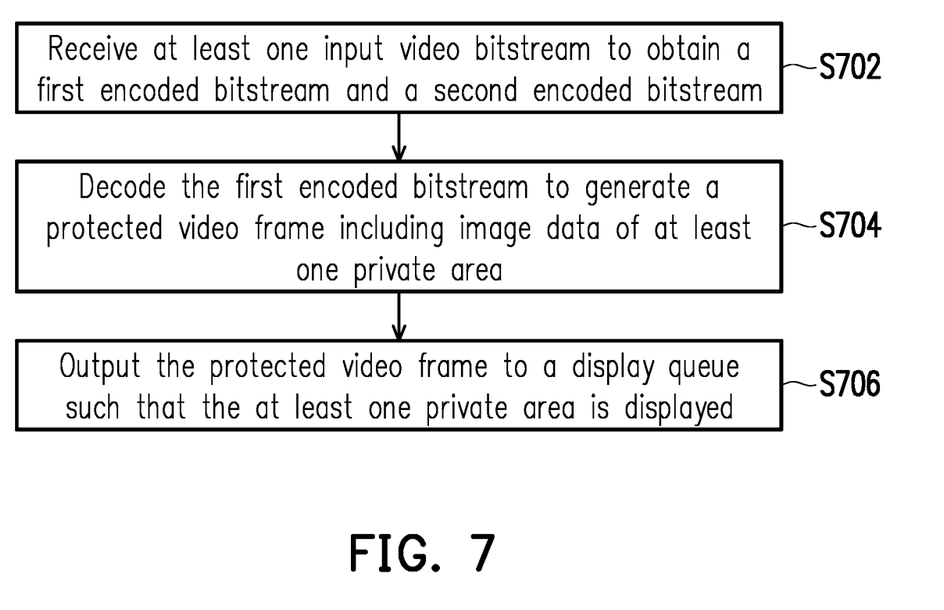
FIG. 7 illustrates a flowchart of a proposed method for decoding private data in accordance with one of the exemplary embodiments of the disclosure.

FIG. 7 illustrates a flowchart of a proposed method for decoding private data in accordance with one of the exemplary embodiments of the disclosure. The steps of FIG. 7 could be implemented by the proposed image processing device 600A and 600B as respectively illustrated in FIG. 6A and FIG. 6B.

Referring to FIG. 7 in conjunction to FIG. 6A, the receiving circuit 610 would receive at least one input video bitstream to obtain a first encoded bitstream and a second encoded bitstream (Step S702). Next, the decoding circuit 620 would decode the first encoded bitstream to generate a protected video frame including image data of at least one private area (Step S704), and the output circuit 630 would output the protected video frame to a display queue such that the at least one private area is displayed (Step S706). More details would be provided later. Note that the steps S702-S706 could also be performed by the processor 650 of the image processing device 600B in FIG. 6B. The descriptions would be omitted for brevity's sake.

Figure 8A:
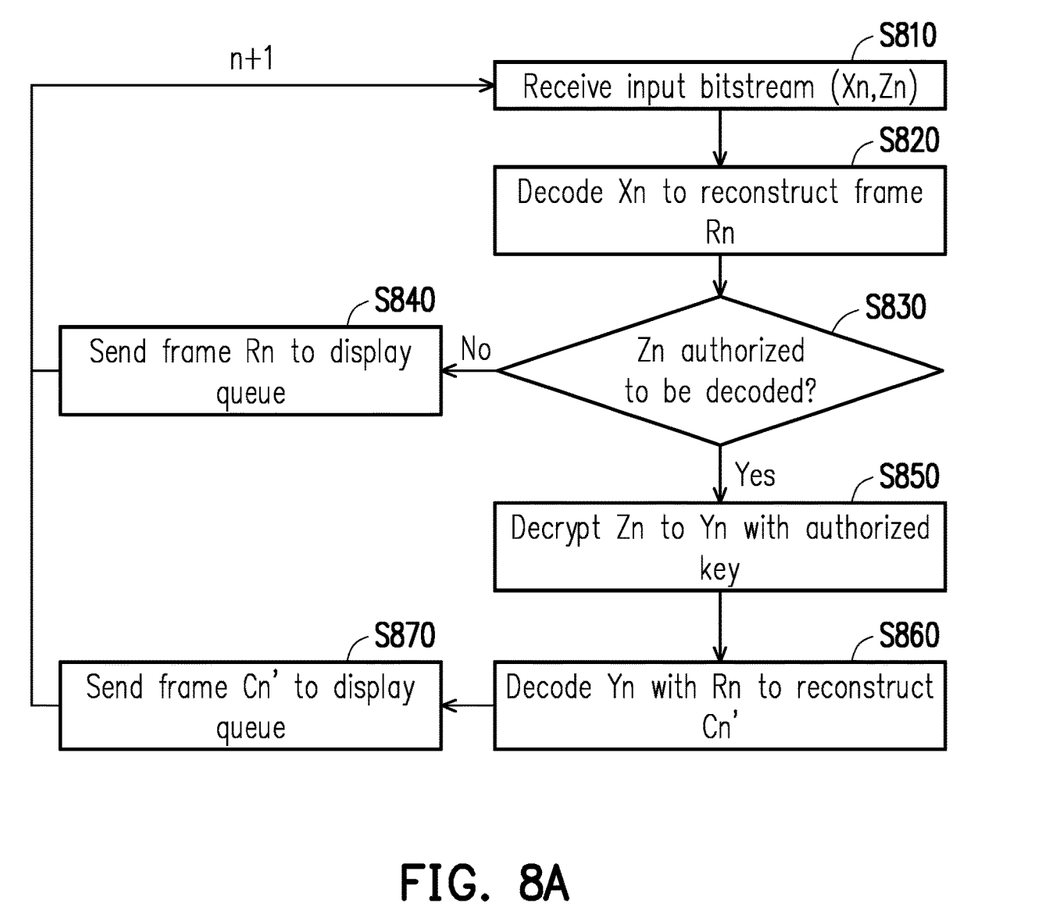
FIG. 8A illustrates a functional diagram of a proposed method for decoding private data in accordance with one of the exemplary embodiments of the disclosure.

For better comprehension, FIG. 8A illustrates a functional diagram of a proposed method for decoding private data in accordance with one of the exemplary embodiments of the disclosure. The steps of FIG. 8A could be implemented by the proposed image processing device 600A and 600B as respectively illustrated in FIG. 6A and FIG. 6B. In the following description, only one frame would be presented for illustration purposes.

Referring to FIG. 8A in conjunction to FIG. 6A, the receiving circuit 610 would receive an input bitstream (Xn, Zn) (S810) as packed in (S540) in FIG. 5, where Xn and Zn would be referred to as "a first encoded bitstream" and "a second encoded bitstream" hereafter. Next, decoding circuit 620 would decode the first encoded bitstream Xn to reconstruct a reference frame Rn not having image data of at least one private area (S820). Note that the first bitstream Xn would be decoded with a reference frame R(n−1) if coded to p-frame. Next, the decrypting circuit 625 would determine whether the second encoded bitstream Zn is authorized to be decoded (i.e. whether an authorized key is available) (S830).

If the second encoded bitstream Zn is not authorized to be decoded, the output circuit 630 would send the reference frame Rn to a display queue (S840). Herein, only the first encoded bitstream Xn is decoded, and only the reference frame Rn is output to the display queue. The second encoded bitstream Zn is not decoded, and the protected video frame Cn' is not output to the display queue. Since only the reference frame Rn is displayed with the private area being blurred.

On the other hand, if the second encoded bitstream Zn is authorized to be decoded, the decrypting circuit 625 would decrypt the second encoded bitstream Zn to a second encoded frame Yn (S850) and decode the second encoded frame Yn with the reference frame Rn to reconstruct a protected video frame Cn' (S860), and the output circuit 630 would send the protected video frame to the display queue (S870). Herein, both the first encoded bitstream Xn and the second encoded bitstream Zn are decoded to generate the reference frame Rn and the protected video frame Cn' that are output to the display queue. Therefore, a whole image (i.e. an original frame) would be displayed without the private area being blurred. Once the input bitstream (Xn, Zn) has been processed, the flow moves to S810 to process a subsequent bitstream (X(n+1), Z(n+1)).

Note that the flow in FIG. 8A could also be performed by the processor 650 of the image processing device 600B in FIG. 6B. The descriptions would be omitted for brevity's sake.

Figure 8B:
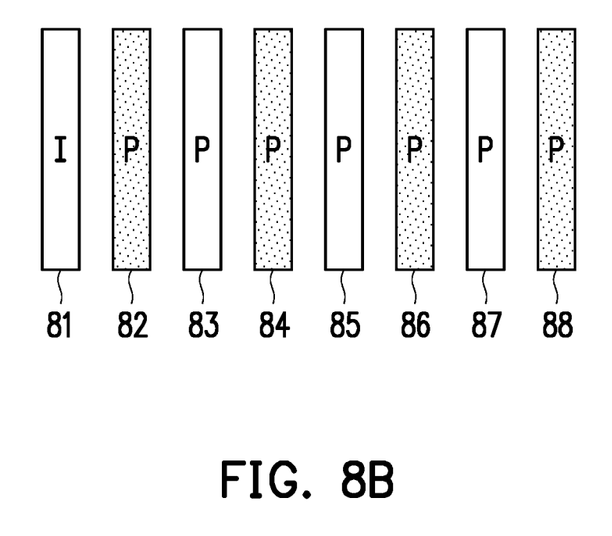
FIG. 8B illustrates a schematic diagram of private data and protected data for playback in accordance with one of exemplary embodiments of the disclosure.

FIG. 8B illustrates a schematic diagram of private data and protected data for playback in accordance with one of exemplary embodiments of the disclosure. During video playback, if the authorized key does not exist, only the protected data 81, 83, 85, 87 would be displayed. If the authorized key exists, the protected data 81, 83, 85, 87 would be alternately combined with the protected data 82, 84, 86, 88, and the combination of the protected data and the private data 81-88 would be displayed.

Note that in the flows in FIG. 6 and FIG. 8A, the private data is able to be secured at a data level by using a single video stream with a protected private layer. Non-private video would be decoded in NVR without certification, and the private layer requires an authorized key for decoding with instant authorization and expiration. For example, the authorized key may be different for each camera, each zone, each time interval, and so forth. Moreover, reduced spaces (approximately only up to 1.2 times of memory spaces) are required for storage and streaming for transmission.

In view of the aforementioned descriptions, the proposed methods and the image processing devices would be able to provide video transmission in a secure and efficient fashion.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for encoding private data comprising:
receiving an original video frame;
masking at least one private area in the original video frame to generate a protected video frame;
performing an encoding operation on the protected video frame to generate a first encoded frame and a specific reference frame;
generating at least one output bitstream for streaming or storage according to the first encoded frame; and
using the specific reference frame generated from the protected video frame to encode the original video frame.

2. The method of claim 1 further comprising:
generating a second encoded frame by encoding the original video frame, and wherein the step of generating the at least one output bitstream for streaming or storage according to the first encoded frame comprises:
generating the at least one output bitstream for streaming or storage according to the first encoded frame and the second encoded frame.

3. The method of claim 2 further comprising:
encrypting the second encoded frame to generate an encrypted second encoded frame, wherein the step of generating the at least one output bitstream for streaming or storage according to the first encoded frame comprises:
generating the at least one output bitstream for streaming or storage according to the first encoded frame and the encrypted second encoded frame.

4. The method of claim 3, wherein the at least one output bitstream comprises a first output bitstream and a second output bitstream, and wherein the step of generating the at least one output bitstream for streaming or storage according to the first encoded frame and the second encoded frame comprises:
packing the first encoded frame into the first output bitstream; and
packing the encrypted second encoded frame into the second output bitstream.

5. The method of claim 3, wherein the at least one output bitstream comprises a combined output bitstream, and wherein the step of generating the at least one output bitstream for streaming or storage according to the first encoded frame and the second encoded frame comprises:
packing the first encoded frame and the encrypted second encoded frame into the combined output bitstream.

6. The method of claim 1 further comprising:
duplicating the original video frame to generate a duplicated original video frame; and
performing masking on the duplicated original video frame.

7. An image processing device comprising:
a receiving circuit, configured to receive an original video frame;
a masking circuit, configured to mask at least one private area in the original video frame to generate a protected video frame;
an encoding circuit, configured to perform an encoding operation on the protected video frame to generate a first encoded frame and a specific reference frame, wherein the encoding circuit is further configured to encode the original video frame by using the specific reference frame generated from the protected video frame; and
an output circuit, configured to generate at least one output bitstream for streaming or storage according to the first encoded frame.

8. The image processing device of claim 7,
wherein the encoding circuit is further configured to generate a second encoded frame by encoding the original video frame, and
wherein the output circuit is configured to generate the at least one output bitstream for streaming or storage according to the first encoded frame and the second encoded frame.

9. The image processing device of claim 8 further comprising:
an encrypting circuit, configured to encrypt the second encoded frame to generate an encrypted second encoded frame, wherein the output circuit is further configured to generate the at least one output bitstream for streaming or storage according to the first encoded frame and the encrypted second encoded frame.

10. The image processing device of claim 9,
wherein the at least one output bitstream comprises a first output bitstream and a second output bitstream, and
wherein the output circuit is configured to generate the at least one output bitstream for streaming or storage according to the first encoded frame and the second encoded frame by packing the first encoded frame into the first output bitstream and packing the encrypted second encoded frame into the second output bitstream.

11. The image processing device of claim 9,
wherein the at least one output bitstream comprises a combined output bitstream, and
wherein the output circuit is configured to generate the at least one output bitstream for streaming or storage according to the first encoded frame and the second encoded frame by packing the first encoded frame and the encrypted second encoded frame into the combined output bitstream.

12. The image processing circuit of claim 7,
wherein the receiving circuit is further configured to duplicate the original video frame to generate a duplicated original video frame, and
wherein the masking circuit is configured to perform masking on the duplicated original video frame.

13. An image processing device comprising:
a processor, configured to:
receive an original video frame;
mask at least one private area in the original video frame to generate a protected video frame;
perform an encoding operation on the protected video frame to generate a first encoded frame and a specific reference frame;
generate at least one output bitstream for streaming or storage according to the first encoded frame; and
using the specific reference frame generated from the protected video frame to encode the original video frame.

14. A method for decoding private data comprising:
receiving a first encoded bitstream and receiving a second encoded bitstream different from the first encoded bitstream;
decoding the first encoded bitstream to generate a specific reference frame comprising a blurred image data and generate a protected video frame comprising image data associated with at least one private area, wherein the blurred image data generated from the first encoded bitstream serves to decode the second encoded bitstream different from the first encoded bitstream; and
outputting the protected video frame to a display queue such that the at least one private area is displayed.

15. The method of claim 14, further comprising:
outputting the specific reference frame to the display queue.

16. The method of claim 15 further comprising:
decrypting the second encoded bitstream when a key is authorized before the second encoded bitstream is decoded.

17. The method of claim 16, wherein both the first encoded bitstream and the second bitstream are decoded to generate both the specific reference frame and the protected video frame which are output to the display queue when the key is authorized such that a whole image is displayed without the at least one private area being blurred.

18. The method of claim 16 further comprising:
not decrypting the second encoded bitstream when the key is not authorized.

19. The method of claim 18, wherein when the key is not authorized, only the first encoded bitstream is decoded and only the specific reference frame is output to the display queue and the second encoded bitstream is not decoded and the protected video frame is not output to the display queue, such that the at least one private area is blurred in response to only the specific reference frame is being displayed.

20. An image processing device comprising:
a receiving circuit, configured to receive a first encoded bitstream and receive a second encoded bitstream different from the first encoded bitstream;
a decoding circuit, configured to decode the first encoded bitstream to generate a specific reference frame comprising a blurred image data and generate a protected video frame comprising image data associated with at least one private area, wherein the blurred image data generated from the first encoded bitstream serves to decode the second encoded bitstream different from the first encoded bitstream; and
an output circuit configured to output the protected video frame to a display queue such that the at least one private area is displayed.

21. The image processing device of claim 20,
wherein the output circuit is further configured to output the specific reference frame to the display queue.

22. The image processing device of claim 21 further comprising:
a decrypting circuit, configured to decrypt the second encoded bitstream when a key is authorized before the second encoded bitstream is decoded.

23. The image processing device of claim 21,
wherein the decoding circuit is configured to decode both the first encoded bitstream and the second bitstream to generate both the specific reference frame and the protected video frame, and
wherein the output circuit is configured to output both the specific reference frame and the protected video frame to the display queue when the key is authorized such that a whole image is displayed without the at least one private area being blurred.

24. The image processing device of claim 22, wherein the decrypting circuit is not configured to decrypt the second encoded bitstream when the key is not authorized.

25. The image processing device of claim 24,
wherein the decoding circuit is configured to decode only the first encoded bitstream when the key is not authorized, and
wherein the output circuit is configured to output only the specific reference frame to the display queue when the key is not authorized, such that the at least one private area is blurred in response to only the specific reference frame is being displayed.

26. An image processing device comprising:
a processor, configured to:
receive a first encoded bitstream and receive a second encoded bitstream different from the first encoded bitstream;
decode the first encoded bitstream to generate a specific reference frame comprising a blurred image data and generate a protected video frame comprising image data associated with at least one private area, wherein the blurred image data generated from the first encoded bitstream serves to decode the second encoded bitstream different from the first encoded bitstream; and
output the protected video frame to a display queue such that the at least one private area is displayed.

* * * * *